UNITED STATES PATENT OFFICE.

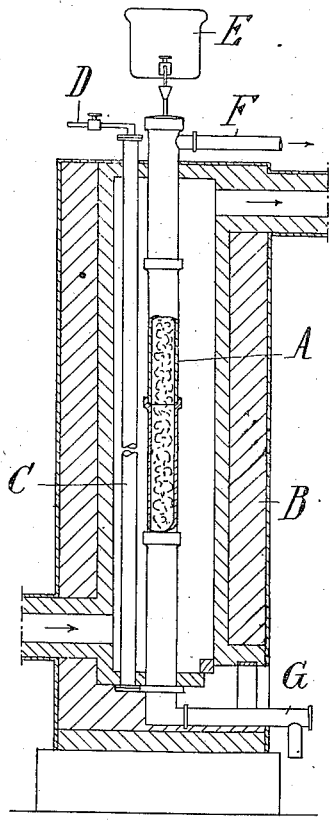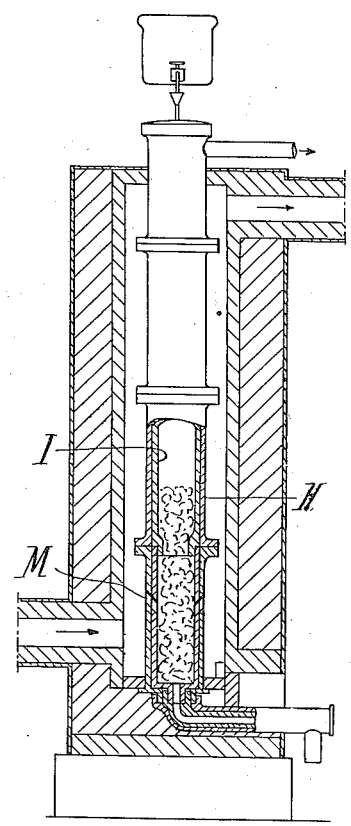

RAGNAR SOHLMAN, OF BOFORS, SWEDEN, AND WALTER ATKINSON WILSON, OF ARDEER, SCOTLAND.

PROCESS OF CONCENTRATING ACIDS.

1,009,196.

Specification of Letters Patent.   Patented Nov. 21, 1911.

Application filed April 19, 1909. Serial No. 490,959.

*To all whom it may concern:*

Be it known that we, RAGNAR SOHLMAN, a subject of the King of Sweden, and resident of Bofors, Sweden, and WALTER ATKINSON WILSON, a subject of the King of the United Kingdom of Great Britain and Ireland, and resident of Ardeer, Scotland, have invented a new and useful Improved Continuous Process of Concentrating Acids, of which the following is a specification, reference being had to the accompanying drawing, which forms a part of this specification.

This invention relates to an improved continuous process of concentrating acids, for instance sulfuric acid, distilling nitric acid from its mixture with sulfuric acid, for instance the waste acid obtained in the nitration of cotton and the like.

The process consists, chiefly, in having the acid or mixture of acids, or the like, to be treated, flow continuously down through a vertical conduit or column of acid-proof material filled with silica or the like and heated externally, and leading a current of hot air or any other gas in opposite direction through the said conduit or column.

In order to make the nature of our invention more easily understood we have described the same herebelow with reference to the accompanying drawing which shows a sectional view of an apparatus for carrying the process into practice, in which—

Figure 1 is a vertical section of one form of apparatus, and Fig. 2 a modification thereof.

The apparatus shown in the drawing consists of a column or tower A composed of pipes of acid-proof material, for instance pig-iron with a high percentage of silicon. The said column is inserted in a furnace shaft B through which can be led hot gases for heating the column. The direction of flow of the gases is indicated by arrows. The column at its lower end communicates with a pre-heating apparatus, into which air or any other gas is sucked or pressed through a pipe D and from which the said air or gas is supplied to the column. The interior of the column is filled with silica, pumice-stone or similar acid-proof material.

The acid is supplied from a receptacle E in a uniform current dropping down onto the filling material of the column A in which it is heated by the hot gases surrounding the column. If the said acid is diluted sulfuric acid, the water together with some acid escapes from the upper part of the tower through the pipe F. If the apparatus is used for distilling nitric acid from its mixture with sulfuric acid the supply of acid is regulated in such a manner that nitric acid in the most concentrated condition possible distils over through the pipe F, while the sulfuric acid diluted by the water contained in the mixture flows off through the pipe G. The distillation of the water or the nitric acid is in both cases facilitated by the hot air, or the like, supplied from the pre-heater and flowing upward through the column. This inner current of gas increases in a high degree the efficiency of the apparatus and forms the main feature of the present invention.

Instead of sucking or pressing air through a special pre-heater as described above a part of the hot gases flowing around the column may be sucked or pressed into the latter. In this case the pre-heater may be dispensed with and the column at its lower end be provided with one or more openings for admitting the said hot gases. For sucking in the gases into the column it is sufficient to provide an exhauster or any other suction device in the gas outlet F, while for introducing the gases by pressure it is sufficient to have the gases under a certain pressure in the shaft surrounding the column.

In Fig. 2 is shown a modification of the apparatus now described.

The tube used for the purpose herein set forth consists in the modification shown in Fig. 2 of an outer shell H of cast iron, and an inner lining I of more refractory material, such as a porcelain or an acid proof earthenware pipe. The space between the outer and the inner pipe is packed with some suitable cement, putty or other substance, such as silica sand, iron cement, sulfate of baryte with a suitable agglomerating admixture, such as pitch, or the like.

The heat is supplied partly from the outside and partly by the hot gases pressed or sucked through the tube H. The gases enter into the tube H by a series of holes M arranged at a certain distance from the bottom of the tube.

Having now described our invention what we claim as new and desire to secure by Letters Patent is:

1. The continuous process of concentrating acids, or distilling nitric acid from its mixture with sulfuric acid, which comprises feeding the liquid into the top of a closed chamber, and subdividing it into fine streams during its descent through said chamber by acid-proof contact surfaces, supplying at the bottom of the closed chamber a continuous current of a heated vaporizing gas which is cooled during its ascent among the sub-divided streams, and exteriorly heating said chamber by a continuous current of hot gases also decreasing in temperature from the bottom to the top of said chamber to supply heat to the liquid during its descent by conduction through the walls of said chamber at temperatures decreasing from the bottom to the top of said chamber, and discharging the vapors at the upper end of the chamber and the liquid at the lower end thereof.

2. The continuous process of concentrating and distilling nitric acid from its mixtures with dilute sulfuric acid, which comprises feeding the mixture by gravity into the top of a closed chamber, sub-dividing the mixture into fine streams during its descent by acid-proof contact surfaces, supplying a heated vaporizing gas into the bottom of the chamber and heating the opposed currents of acid mixture and gas by heat conducted thereto from a current of hot gases decreasing in temperature from the bottom to the top of said chamber, the path of flow of the acid mixture being sufficiently long with respect to the temperatures of the gases at the bottom of the chamber to deliver mainly nitric acid vapor from the top of said chamber and dilute sulfuric acid at the bottom of the chamber.

In testimony that we claim the foregoing as our invention, we have signed our names in presence of two subscribing witnesses.

RAGNAR SOHLMAN.
WALTER ATKINSON WILSON.

Witnesses:
JOHN DELMAR,
EWALD DELMAR.